United States Patent [19]
Waldherr et al.

[11] Patent Number: 5,336,076
[45] Date of Patent: Aug. 9, 1994

[54] NIP GAP SETTING APPARATUS FOR USE IN A DOUGH PASSING DEVICE

[75] Inventors: Michael P. Waldherr, Brooklyn Park; Michael L. Johnston, Champlin; James N. Weinstein, Minneapolis; Thomas G. Cremers, Buffalo, all of Minn.

[73] Assignee: General Mills, Inc., Minneapolis, Minn.

[21] Appl. No.: 59,092

[22] Filed: May 10, 1993

[51] Int. Cl.$^5$ .............................. B29C 43/24
[52] U.S. Cl. ........................ 425/294; 264/175; 425/367; 426/502; 426/517
[58] Field of Search ............ 425/141, 130, 363, 294, 425/367, 335; 264/175; 426/502, 517

[56] References Cited

U.S. PATENT DOCUMENTS

| | | | |
|---|---|---|---|
| 1,844,142 | 2/1932 | Barili | 99/450.2 |
| 3,249,068 | 5/1966 | Gembicki | 425/133.1 |
| 3,279,398 | 10/1966 | Weiss | 426/391 |
| 3,461,483 | 8/1969 | Felstehausen | 425/113 |
| 3,561,359 | 2/1971 | Cohen | 101/250 |
| 3,724,980 | 4/1973 | Lassmann et al. | 425/102 |
| 3,851,569 | 12/1974 | Madrid | 99/407 |
| 4,615,672 | 10/1986 | Smith et al. | 425/296 |
| 4,776,785 | 10/1988 | Jones et al. | 425/239 |
| 5,018,960 | 5/1991 | Singer | 425/367 |

*Primary Examiner*—Tim Heitbrink
*Attorney, Agent, or Firm*—John A. O'Toole; L. MeRoy Lillehaugen; Alan D. Kamrath

[57] ABSTRACT

An apparatus (79) for setting the nip gap between first and second rollers (30, 32) includes nip control blocks (83) movably mounted adjacent the front edges (150) of the end plates (151a, 151b) between which one of the rollers (32) is journaled. In the preferred form, each of the control blocks (83) are threadably received on a shaft (138) and include a slide surface (142) which slides on a shoe (134) mounted on the end plates (151a, 151b) and include an opposite, abutment surface (144) at a minor acute angle to the slide surface (142) and the movement direction of the control blocks (83). Contact surfaces (164) are articulately mounted to the end plates (51a, 51b) between which the other of the rollers (30) is journaled. In the preferred form, the contact surfaces (164) are formed on a thrust knuckle (160) having a semi-spherical surface (162) slideably received in a semi-spherical depression (156) of a thrust socket (154) secured in a recess (146) in the front edges (150) of the end plates (51a, 51b). The rollers (30, 32) are pivotally mounted relative to each other by pivotally mounting the end plates (51a, 51b) of the first roller (30) relative to the end plates (151a, 151b) of the other roller (32). The thrust knuckles (160) and sockets (154) allow rotary motion of the contact surfaces (164) relative to the end plates (51a, 51b) to flushly abut with the abutment surfaces (144) of the nip control blocks (83) independent of the movement position of the nip control blocks (83) and of the pivot position of the rollers (30, 32) relative to each other.

15 Claims, 2 Drawing Sheets

NIP GAP SETTING APPARATUS FOR USE IN A DOUGH PASSING DEVICE

BACKGROUND

The present invention generally relates to systems for setting the gap between first and second objects movable relative to each other, particularly for gap setting systems for first and second objects which are pivotable relative to each other, and specifically for gap setting systems for the nip between first and second rollers.

In the food industry, a con, non procedure is to pass dough between first and second rollers which act on the dough for a desired result such as cutting shapes out of a sheet of dough. The spacing between the rollers or in other words the nip between the rollers is often critical in the operation. For example, in a cutting procedure, if the spacing is too great, cutting may not occur or may not occur to the desired thickness through the dough. Conversely, if the spacing is too small, excessive pressure will be placed on the knives and the anvil surfaces of the rollers causing excessive wear, increasing power requirements, reducing production, and producing other deficiencies. Prior practice in the food industry was to have one roller fixed and the other roller adjustable by means of slide rails. Adjustment of the spacing between the rollers was accomplished by having two tapered blocks per side that moved vertically toward or away from each other to change the horizontal center distance between the rollers. Replacing fabricated parts in this prior construction was extremely time consuming due to manufacturing tolerances, and often considerable shimming of parts was necessary. This was compounded with the frequency that replacement of the rollers occurred. In addition to replacement of rollers that need to be refurbished due to wear and tear, it is often desirable to allow the apparatus to perform different operations by replacing the rollers with ones performing other operations such as cutting different shapes out of a sheet of dough.

Thus, a need exists for a system to easily set the nip gap between rollers which is of simple design, which can be easily fabricated, which can be easily adjusted without requiring shims or the like, and which lends itself to roller replacement as needed or desired.

SUMMARY

The present invention solves this need in the field of food processing by providing, in the preferred form, a system for setting the nip gap between first and second rollers including first and second blocks movably mounted to the end plates which journal one of the rollers in a movement direction generally perpendicular to the pivot direction of the second roller relative to the first roller and including an abutment surface at a minor acute angle to the movement direction and for flushly abutting with contact surfaces articulately mounted to the end plates of the other of the rollers when the second roller is pivoted towards the first roller.

It is thus an object of the present invention to provide a system for setting the nip gap between first and second rollers.

It is further an object of the present invention to provide such a novel roller nip gap setting system allowing ease of replacement of the rollers.

It is further an object of the present invention to provide such a novel roller nip gap setting system providing an increased degree of control.

It is further an object of the present invention to provide such a novel roller nip gap setting system which is of simple design.

It is further an object of the present invention to provide such a novel roller nip gap setting system which can be easily fabricated.

It is further an object of the present invention to provide such a novel roller nip gap setting system which does not require shims or the like.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3 shows an enlarged front plan view of the nip gap setting system of FIG. 1, with portions shown in phantom.

Figure 1:
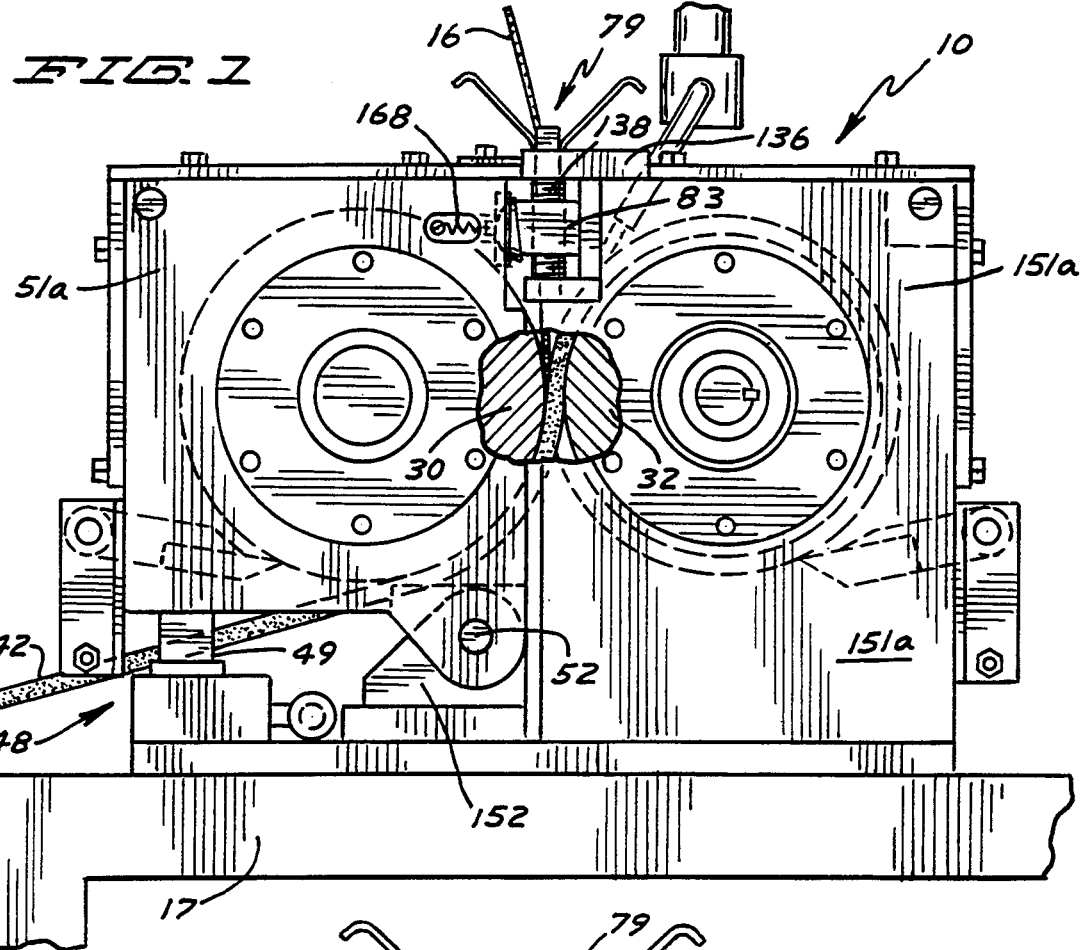
FIG. 1 shows a front plan view of a system for setting the nip gap between first and second rollers according to the preferred teachings of the present invention, with portions broken away to show internal features thereof.
Figure 2:
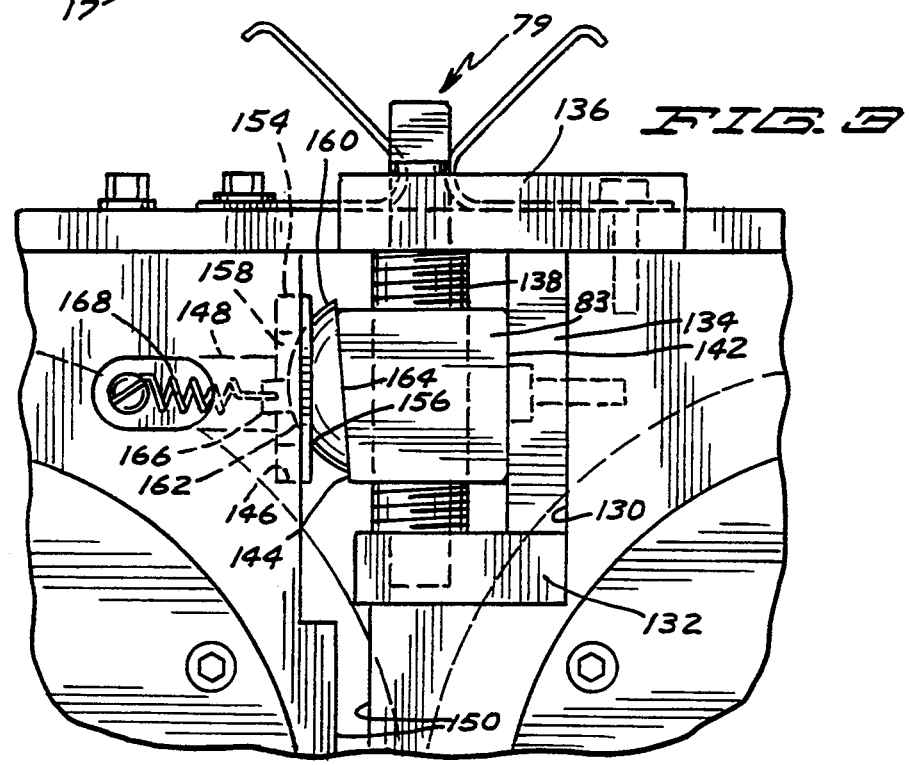
FIG. 2 shows a top plan view of the nip gap setting system of FIG. 1, with portions broken away to show internal features thereof.
Figure 2:
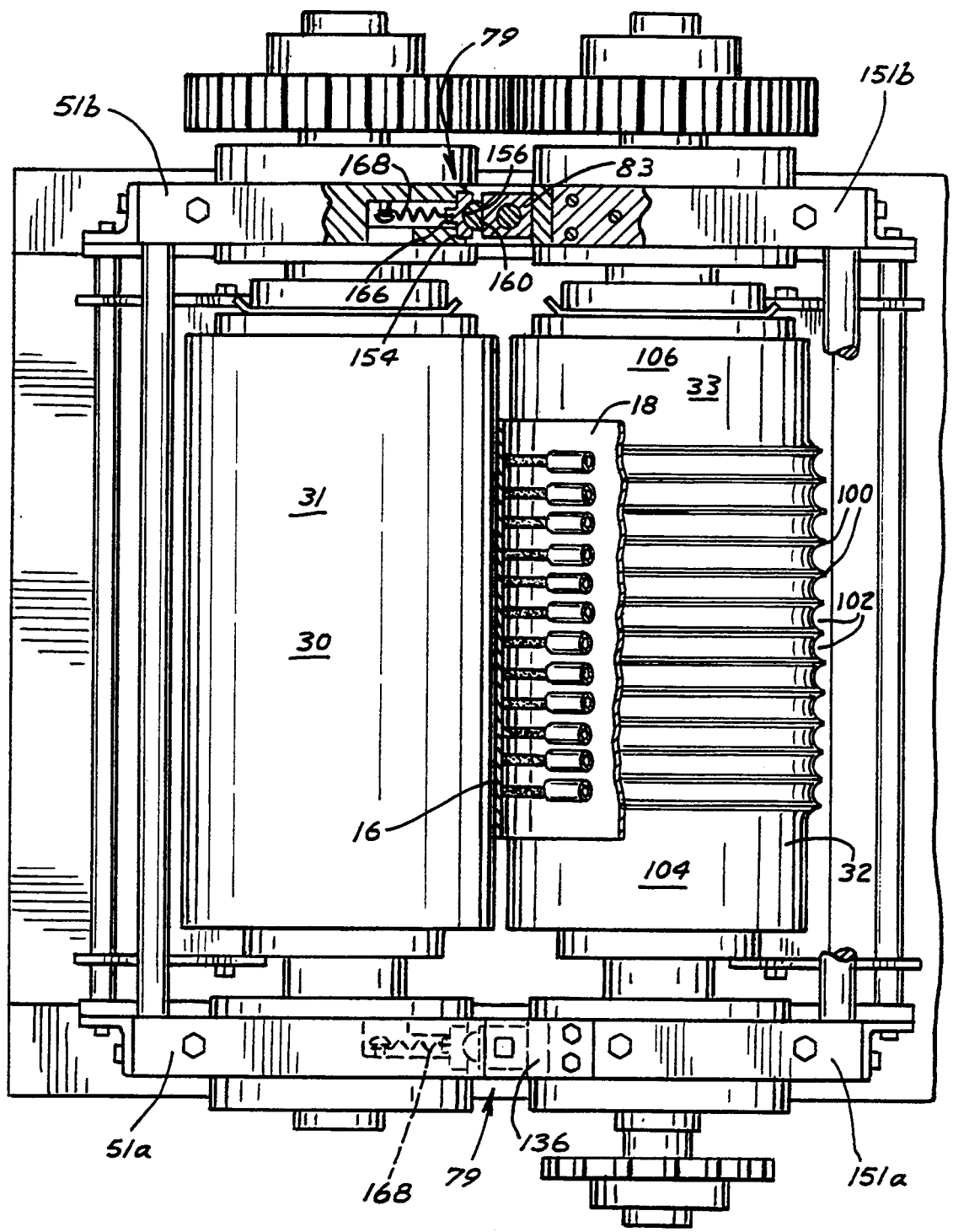

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "upper", "lower", "height", "width", "end", "side", "horizontal", "vertical", "longitudinal", "axial", and similar terms are used herein, it should be understood that these terms have reference only to the structure shown in the drawings as it would appear to a person viewing the drawings and are utilized only to facilitate describing the invention.

DESCRIPTION

A system for setting the nip gap between first and second rollers according to the preferred teachings of the present invention is shown in the drawings and generally designated 79. System 79 is shown and described utilized in an apparatus 10 for forming a continuous dough sheet into a filled pillow snack half product. Apparatus 10 includes a pair of rollers 30 and 32 which fuse and sever upper and lower dough sheets 16 and 18 to form a plurality of longitudinally extending, separable, hollow, side-sealed and filled tubes 42. Rollers 30 and 32 have similar diameters and parallel, spaced, horizontal axes. Rollers 30 and 32 are synchronously rotatable about their respective axes in opposite directions by any conventional means. Rollers 30 and 32 each generally include peripheries 31 and 33, respectively, of equal axial length and which are generally in contact when rollers 30 and 32 are rotated. Roller 30 is seen to be a smooth or anvil roller. In contrast, roller 32 is seen to be fabricated with a plurality of alternating arcuate undulated lands 100 and grooves 102 so as to define a cutter roller having a plurality of circumferential blades. Most importantly, lands 100 are seen clearly to extend above the plane of the smooth roll surface so as to provide the sealing of dough sheets 16 and 18 with the simultaneous cutting of sealed dough sheets 16 and 18 for forming the continuous filled tubes 42 herein. In the preferred embodiment, lands 100 have a flat tip of about 0.020 inch (0.05 cm) width. Grooves 102 are cut into or below the plane of the smooth roll surface. Roller 32 includes a pair of spaced smooth surface areas or portions 104 and 106 proximate the free edges of roller 32. Lands 100 are equally spaced circumferentially around periphery 33 and thus grooves 102 are also equally spaced circumferentially around periphery 33. Grooves 102 have cross sections generally in the shape of a hyperbole with the sides extending at an acute angle and particularly in the range of 32°. The circumferential distance between grooves 102 or in other words the circumferential width of lands 100 at periphery 33 is generally equal to one-tenth of the circumferential width of grooves 102 at periphery 33. The depth of grooves 102 is approximately three-quarters of their circumferential width at periphery 33 and in the most preferred form is equal to 76% of their circumferential width.

Roller 32 is journaled at both ends to an opposed pair of end plates 151a and 151b secured to frame 17 of apparatus 10. Frame 17 further includes an opposed pair of pivot ears 152 secured thereto. Roller 30 is journaled at both ends to an opposed pair of end plates 51a and 51b. End plates 51a and 51b are pivotally mounted to ears 152 by pivot pins 52 which define a horizontal pivot axis which is spaced from and parallel to the axes of rollers 30 and 32. End plates 51a and 51b and roller 30 journaled thereto are pivotal for movement in a pivot direction from a first position to a second position, with rollers 30 and 32 being more closely spaced in the second position than the first position. System 79 sets the nip gap between peripheries 31 and 33 of rollers 30 and 32 by adjustably stopping the pivotal movement of end plates 51a and 51b at desired locations between the first and second positions to thereby adjust the spacing between peripheries 31 and 33 of rollers 30 and 32 that dough sheets 16 and 18 pass.

In the preferred form, end plates 51a, 51b, 151a and 151b are rectangular in shape of a size substantially larger than peripheries 31 and 33 of rollers 30 and 32, and have front edges 150 in a generally face-to-face arrangement in the second position, with front edges 150 being increasingly arcuately spaced as end plates 51a and 51b are pivoted opposite to the pivot direction towards the first position. In the most preferred form, front edges 150 are generally tangent to peripheries 31 and 33, with at least one of front edges 150 being spaced radially inwardly from and parallel to a tangent of peripheries 31 and 33. It can then be appreciated that end plates 51a, 51b, 151a and 151b act as guards for preventing axial entry to rollers 30 and 32 in apparatus 10. Additionally, end plates 51a and 51b act as a stand and otherwise protect roller 30 in the event that roller 30 is removed from apparatus 10 as will be set forth further hereinafter.

In highly preferred embodiments, apparatus 10 is provided with a means 48 for moving end plates 51a and 51b and roller 30 journaled thereto in the pivot direction towards the second position and for providing nip contact compression or pressure to the pair of rollers 30 and 32. In particular, in the most preferred form, means 48 comprises a spaced pair of air-over-oil pneumatic actuators 49 positioned between frame 17 and the lower edges of end plates 51a and 51b, respectively, to apply upward pressure on end plates 51a and 51b causing them to pivot about pivot pins 52 from the first position to the second position. It can be appreciated that other methods and structures can be utilized for moving end plates 51a and 51b such as but not limited to a single actuator centrally located to place equal pressure to end plates 51a and 51b.

In the preferred form, each end plate 151a and 151b includes a rectangular notch 130 formed in front edge 150 at the upper, front corners, with notches 130 each having a vertical surface and a horizontal surface. A horizontal shelf 132 is secured to the horizontal surface of notch 130 and a vertical shoe 134 is secured to the vertical surface of notch 130 generally perpendicular to shelf 132. An arm 136 is attached to the upper edges of each of end plates 151a and 151b and extends over notch 130 generally parallel to and spaced from shelf 132 and perpendicular to shoe 134. Shelf 132, shoe 134, and arm 136 form a generally J-shape. A threaded shaft 138 is rotatably mounted in and between shelf 132 and arm 136 spaced from and parallel to shoe 134. A nip control block 83 is threadably received on shaft 138 intermediate shelf 132 and arm 136. For example, block 83 can mount a threaded spherical bearing, not shown, which is threadably received on shaft 138. Block 83 generally includes an inner, vertical slide surface 142 parallel to and for slideable abutment with shoe 134 and an outer, generally vertical abutment surface 144. Particularly, surface 144 is not parallel to slide surface 142 but extends at a minor acute angle in the order of 5° therefrom. It should then be appreciated that the slideable abutment of surface 142 on shoe 134 prevents rotation of block 83 with shaft 138. Additionally, rotation of shaft 138 causes block 83 to thread itself on shaft 138 and move linearly along a movement direction between shelf 132 and arm 136, with the movement direction being generally perpendicular to the pivot direction of end plates 51a and 51b about pivot pins 52 and which is vertically in the most preferred form. Thus, depending upon the direction of the threads on shaft 138, rotation of shaft 138 in one direction will cause block 83 to move toward shelf 132 and away from arm 136 and rotation in the opposite direction will cause block 83 to move toward arm 136 and away from shelf 132. It can be appreciated that block 83 of end plate 151a can be independently moved by rotation of its corresponding shaft 138 from block 83 of end plate 151b which can also be independenty moved by rotation of its corresponding shaft 138. It should further be noted the slideable abutment of surface 142 on shoe 134 reduces the stress placed upon shaft 138 and the bearings or the like which rotatably mount shaft 138 to shelf 130 and arm 136 by forces placed upon abutment surface 144 generally perpendicular to shaft 138 and towards shoe 134.

In the preferred form, each end plate 51a and 51b includes a recess 146 and a counter bore 148 extending horizontally inward from front edge 150 adjacent to block 83 of roller 32. Counter bore 148 has a cross section of a size smaller than recess 146 and is located concentrically within recess 146. An annular thrust socket 154 is secured in recess 146 and includes an outer, semi-spherical depression 156, with an opening 158 extending radially from depression 156 to and aligned with bore 148. A semi-spherical thrust knuckle 160 is further provided having a semi-spherical surface 162 corresponding to and for slideable receipt in depression 156 of socket 154 and a flat, contact surface 164. Knuckle 160 further includes a tab 166 extending radially from semi-spherical surface 162. A spring 168 extends between the inner end of bore 148 and the free end of tab 166. It should then be noted that spring 168 draws knuckle 160 into depression 156 of socket 154 but allows surface 162 to slide in depression 156 such that surface 164 can be oriented in a plurality of vertical orientations. It can then be appreciated that contact surfaces 164 are articulately mounted to end plates 51a and 51b by socket 154 and knuckle 160 which forms a ball-and-socket joint between contact surfaces 164 and end plates 51a and 51b allowing rotary motion of contact surfaces 164 relative to end plates 51a and 51b. Additionally, contact surface 164 of end plate 51a is independently articulately mounted by its corresponding socket 154 and knuckle 160 from contact surface 164 of end plate 51b which also can be articulately mounted by its corresponding socket 154 and knuckle 160. Contact surfaces 164 of end plates 51a and 51b are located in the pivot direction with corresponding blocks 83 of end plates 151a and 151b with pivotal movement of end plates 51a and 51b about pivot pins 52. It can then be appreciated that due to the rotary motion relative to end plates 51a and 51b, contact surfaces 164 will flushly abut with abutment surfaces 144 of blocks 83 independent of the vertical position of blocks 83 along the movement direction and the pivot position of end plates 51a and 51b and roller 30 relative to end plates 151a and 151b and roller 32.

Now that the basic construction of system 79 according to the preferred teachings of the present invention has been set forth, the operation of system 79 can be explained and appreciated. Specifically, with roller 30 and end plates 51a and 51b pivotally mounted to frame 17 by pivot pins 52, actuators 49 are retracted with end plates 51a and 51b pivoting towards their first position due to the overcenter placement of end plates 51a and 51b and roller 30 relative to pivot pins 52. This will reduce the pressure of contact surfaces 164 on abutment surfaces 144 and may even cause separation therefrom. Thus, movement of blocks 83 can be more easily accomplished. Particularly, one or both of shafts 138 can be rotated in the desired direction to space rollers 30 and 32. In the form shown in the drawings with abutment surfaces 144 extending angularly vertically downward towards edges 150, downward movement of blocks 83 towards shelf 132 causes contact surfaces 164 to abut abutment surfaces 144 at a higher position thereon at a further horizontal position from edge 150. Thus, when actuators 49 are extended, blocks 83 and contact surfaces 164 stop pivoting of end plates 51a and 51b at a location closer to the first position with rollers 30 and 32 spaced further, with actuators 49 holding rollers 30 and 32 at the desired nip pressure. Conversely, upward movement of blocks 83 towards arm 136 causes contact surfaces 164 to abut abutment surfaces 144 at a lower position thereon at a closer horizontal position from edge 150. Thus, when actuators 49 are extended, blocks 83 and contact surfaces 164 stop pivoting of end plates 51a and 51b at a location closer to the second position with rollers 30 and 32 spaced closer, with actuators 49 holding rollers 30 and 32 at the desired nip pressure. Adjustment of blocks 83 can be independently performed on end plates 51a and 51b so that the desired spacing between rollers 30 and 32 occurs along the entire axial length of rollers 30 and 32.

System 79 according to the teachings of the present invention provides a substantial improvement over the conventional design for mounting rollers 30 and 32 wherein one roller moved laterally in a horizontal direction along some slide guides to a position and then being set into that fixed position. The first advantage is the increased degree of control over the spacing and/or nip pressure being applied. Such control over spacing and/or nip pressure in turn provides improvements in the control over the quality of the regularity and appearance of the product being formed. Another advantage resides in the ability to quickly replace roller 30. Replacement of rollers is occasionally desirable such as when a new product shape is desired to be fabricated or when the roller needs to be refurbished due to wear and tear. Under the designs of the prior art, replacement of the roller can take substantial time and effort. In contrast, with system 79 according to the preferred teachings of the present invention, replacement of roller 30 is very straightforward. Specifically, pressure is released from actuators 49 to cause separation of contact surfaces 164 from abutment surfaces 144. At that time, pivot pins 52 can be removed allowing removal of end plates 51a and 51b and roller 30 journaled thereto from apparatus 10. Typically another pair of end plates 51a and 51b and roller 30 journaled thereto can then be positioned in apparatus 10 and pivot pins 52 replaced. Adjustment of blocks 83 can then be undertaken to position roller 30 relative to roller 32 at the desired spacing and/or nip pressure.

In the preferred form, blocks 83 and their mounting structure are located on end plates 151a and 151b which are fixed to frame 17 whereas contact surfaces 164 and their mounting structure are located on end plates 51a and 51b which are pivotally mounted to frame 17. Due to their lesser degree of tolerances and lower manufacturing costs than blocks 83 and their mounting structure, it is more economical to position contact surfaces 164 and its ball-and-socket joint on end plates 51a and 51b. As end plates 51a and 51b typically are not removed from the particular roller 30 when not in use, multiple sets of rollers 30 and end plates 51a and 51b can be provided for use in apparatus 10 when desired. However, it can be appreciated that positioning of blocks 83 and contact surfaces 164 can be reversed from that shown and described.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A nip gap setting apparatus for use in a dough passing device, said nip gap setting apparatus adjusting a nip gap between the peripheries of first and second rollers the dough passes through, said nip gap setting apparatus comprising, in combination: a first pair of end plates, with the first roller being journaled between the first pair of end plates about a first axis; a second pair of end plates, with the second roller being journaled between the second pair of end plates about a second axis; means for pivotally mounting the second pair of end plates relative to the first pair of end plates about a third axis spaced from and parallel to the first and second axes for movement in a pivot direction from a first position towards a second position, with the rollers being more closely spaced in the second position than the first position; a block associated with each of the end plates of one of the first and second pairs, each block including an abutment surface; means for independently moving the blocks along a movement direction generally perpendicular to the pivot direction at a minor acute angle to the abutment surfaces; first and second contact surfaces; first and second means for independently articulately mounting the first and second contact surfaces to the end plates of the other of the first and second pairs allowing rotary motion of the contact surfaces relative to the end plates to flushly abut with the abutment surfaces independent of the position of the blocks along the movement direction and the pivot position of the second pair of end plates relative to the first pair of end plates, the blocks and contact surfaces being located in the pivot direction between the first and second positions; and means for moving the second pair of end plates in the pivot direction towards the second position with the blocks and contact surfaces stopping movement of the second pair of end plates at locations between the first and second positions depending upon the position of the blocks along the movement direction.

2. The nip gap setting apparatus of claim 1 wherein each of the articulately mounting means comprises, in combination: a thrust knuckle having a semi-spherical surface and the contact surface; and a thrust socket carried by the end plate, with the thrust socket having a semi-spherical depression corresponding to and for slideably receiving the semi-spherical surface of the thrust knuckle.

3. The nip gap setting apparatus of claim 2 wherein each of the articulately mounting means further comprises, in combination: a counter bore formed in the end plate, with the thrust socket being annular in shape and including an opening extending radially from the semi-spherical depression, with the thrust knuckle including a tab extending radially from the semi-spherical surface, through the opening in the thrust socket, and into the counter bore; and means anchored in the counter bore and to the tab for drawing the thrust knuckle into the semi-spherical depression of the thrust socket but allowing slideable movement of the thrust knuckle relative to the thrust socket.

4. The nip gap setting apparatus of claim 3 wherein the end plates are rectangular in shape, with the end plates having front edges in a generally face-to-face arrangement in the second position, with the blocks and contact surfaces located adjacent the front edges of the end plates.

5. The nip gap setting apparatus of claim 4 wherein each of the articulately mounting means further comprises, in combination: a recess formed in the front edges of the end plates, with the thrust socket being received in the recess, with the counter bore having a cross section smaller than the recess and located within the recess.

6. The nip gap setting apparatus of claim 3 wherein the drawing means comprises a coil spring.

7. The nip gap setting apparatus of claim 2 wherein each of the block moving means comprises, in combination: a rectangular notch formed in the end plate, with the notch having first and second arms extending perpendicular to the movement direction; a threaded shaft rotatably mounted in and between the first and second arms and parallel to the movement direction, with the block being threadably attached to the threaded shaft intermediate the first and second arms; and means for preventing the block from rotating with the threaded shaft.

8. The nip gap setting apparatus of claim 7 wherein the preventing means comprises a bearing surface in the rectangular notch parallel to the movement direction; and a slide surface formed on the block opposite to the abutment surface for slideable abutment with the bearing surface.

9. The nip gap setting apparatus of claim 8 wherein the bearing surface comprises a shoe secured in the rectangular notch.

10. The nip gap setting apparatus of claim 9 wherein the end plates are rectangular in shape, with the end plates having front edges in a generally face-to-face arrangement in the second position, with the blocks and contact surfaces located adjacent the front edges of the end plates.

11. The nip gap setting apparatus of claim 1 wherein each of the block moving means comprises, in combination: a rectangular notch formed in the end plate, with the notch having first and second arms extending perpendicular to the movement direction; a threaded shaft rotatably mounted in and between the first and second arms and parallel to the movement direction, with the block being threadably attached to the threaded shaft intermediate the first and second arms; and means for preventing the block from rotating with the threaded shaft.

12. The nip gap setting apparatus of claim 11 wherein the preventing means comprises a bearing surface in the rectangular notch parallel to the movement direction; and a slide surface formed on the block opposite to the abutment surface for slideable abutment with the bearing surface.

13. The nip gap setting apparatus of claim 12 wherein the bearing surface comprises a shoe secured in the rectangular notch.

14. The nip gap setting apparatus of claim 13 wherein the end plates are rectangular in shape, with the end plates having front edges in a generally face-to-face arrangement in the second position, with the blocks and contact surfaces located adjacent the front edges of the end plates.

15. The nip gap setting apparatus of claim 1 wherein the end plates are rectangular in shape, with the end plates having front edges in a generally face-to-face arrangement in the second position, with the blocks and contact surfaces located adjacent the front edges of the end plates.

* * * * *